United States Patent [19]

Luecke

[11] Patent Number: 4,518,922
[45] Date of Patent: May 21, 1985

[54] DECISION-DIRECTED, AUTOMATIC FREQUENCY CONTROL TECHNIQUE FOR NON-COHERENTLY DEMODULATED M-ARY FREQUENCY SHIFT KEYING

[75] Inventor: James R. Luecke, Franklin, Mass.

[73] Assignee: Harris Corporation, Melbourne, Fla.

[21] Appl. No.: 458,459

[22] Filed: Jan. 17, 1983

[51] Int. Cl.³ .................. H03L 7/08; H04L 27/14
[52] U.S. Cl. .................. 329/50; 329/124; 329/145; 375/120
[58] Field of Search .............. 329/50, 104, 107, 110, 329/122, 124, 145; 375/45, 47, 48, 49, 88, 89, 90, 94, 120

[56] References Cited

U.S. PATENT DOCUMENTS

| | | | |
|---|---|---|---|
| 3,758,870 | 9/1973 | Schmitt et al. | 329/104 |
| 4,039,961 | 8/1977 | Ishio et al. | 329/50 |
| 4,079,329 | 3/1978 | England et al. | 329/50 |
| 4,100,499 | 7/1978 | Monrolin | 329/50 |
| 4,103,244 | 7/1978 | Tan | 329/122 |
| 4,320,345 | 3/1982 | Waggener | 329/50 |
| 4,394,626 | 7/1983 | Kurihara et al. | 375/120 X |

OTHER PUBLICATIONS

Blerkom et al., "Digital Phase-Locked Loop", IBM Technical Disclosure Bulletin, vol. 10, No. 3, Aug. 1967, pp. 256, 257.

Primary Examiner—Siegfried H. Grimm
Attorney, Agent, or Firm—Antonelli, Terry & Wands

[57] ABSTRACT

A data receiver apparatus for recovering digital data signals from an M-ARY FSK modulated signal incorporates a dedicated linear discriminator, downstream of the data recovery process, in the carrier tracking loop. Because the signal modulation components are removed prior to tracking, only frequency error remains, which is employed by the linear discriminator for steering a VCO in the frequency tracking loop. This results in a closed loop step response that rapidly converges to a stable level, and a linear frequency estimation characteristic.

14 Claims, 3 Drawing Figures

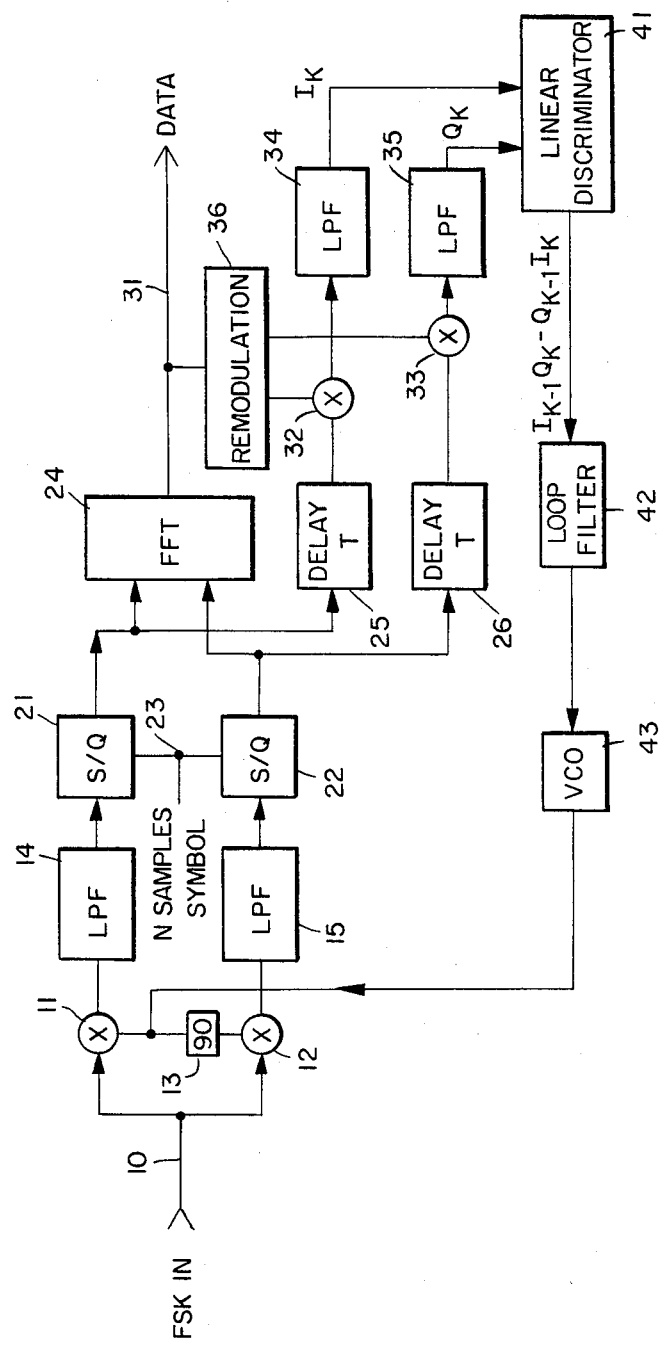

DECISION-DIRECTED, AUTOMATIC FREQUENCY CONTROL TECHNIQUE FOR NON-COHERENTLY DEMODULATED M-ARY FREQUENCY SHIFT KEYING

FIELD OF THE INVENTION

The present invention relates to communication systems and is particularly directed to a data receiver apparatus for recovering digital data signals from an M-ARY FSK modulated signal through frequency tracking of non-coherently demodulated FSK signals.

BACKGROUND OF THE INVENTION

Frequency shift keying (or digital frequency modulation) is commonly employed in data communication systems for carrying out the transmission and recovery of digital data. At the receiver the identification of the transmitted digital symbols may be accomplished coherently or by use of a non-coherent recovery system. Coherent detection employs a fixed frequency reference and a local carrier recovery loop and becomes severely degraded when the signals are subject to secondary frequency-shifting and noise. Non-coherent detection does not require a stable frequency reference but still must provide an accurate carrier tracking loop in order to follow frequency excursions between adjacent symbols. This is particularly true in frequency hopping systems where accurate carrier tracking and noise/jitter performance in the presence of large dynamic variations are required.

Conventional approaches for carrier synchronization typically derive an estimate of frequency error from the magnitudes of the spectral components derived from an MFSK detector, especially those components that are adjacent to the nominal signal frequency. Now, while these techniques offer the advantage of using the same detector for frequency error estimation as they do for data detection, because of the non-linear characteristics of these types of estimators, they are not suited for accurate tracking of large dynamics. This shortcoming is illustrated in FIG. 1 wherein curve A shows the non-linear frequency estimation characteristics of the most common Fast Fourier Transfer (FFT) based discriminator, where E is the input error (relative to the spectral spacing) and F is the frequency estimate. Similarly, the closed loop step response of a non-linear FFT estimator is depicted as curve C in FIG. 2. As shown therein, the conventional response undergoes a large dynamic swing over the entirety of the range, so that it cannot realistically track large frequency changes from symbol to symbol.

SUMMARY OF THE INVENTION

Rather than employ the non-linear frequency estimation approach of the prior art, which suffers from the above-mentioned inadequacies, the present invention incorporates a dedicated linear discriminator, downstream of the data recovery process, in the carrier tracking loop. Because the signal modulation components are removed prior to tracking, only frequency error remains, which is employed by the discriminator for steering a VCO in the frequency tracking loop. This results in a closed loop step response that rapidly converges to a stable level, and a linear frequency estimation characteristic, as opposed to the non-linear behavior of the conventional FFT discriminator noted above. This makes the invention suited for MFSK systems and especially for a frequency hopping scheme using MFSK modulation, as well as any orthogonal modulation technique such as M-ARY Code Shift Keying and M-ARY Time Shift Keying.

BRIEF DESCRIPTION OF THE DRAWINGS

FIG. 3 shows a schematic block diagram of a non-coherent FSK demodulator having an improved frequency tracking loop according to the invention.

DETAILED DESCRIPTION

Figure 1:
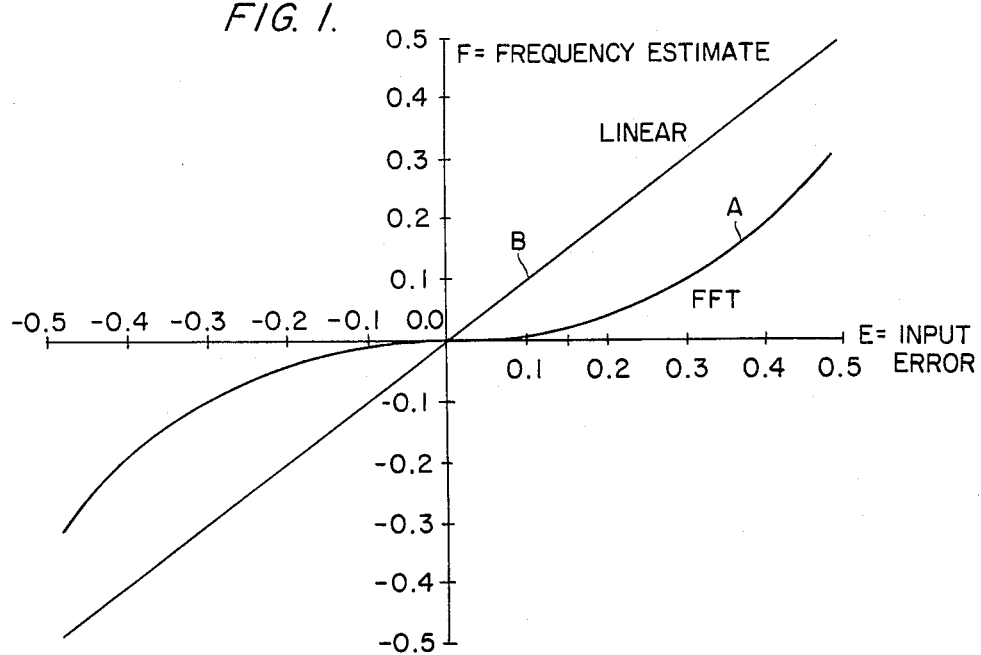
FIG. 1 shows the relationship between frequency estimate and input error for a conventional FFT discriminator and a linear discriminator according the the present invention.

Before describing, in detail, the particular improved automatic carrier frequency control scheme for FSK demodulation in accordance with the present invention, it should be observed that the invention resides primarily in a novel structural combination of conventional communication circuits, and not in the particular detailed configurations thereof. Accordingly, the structure, control and arrangement of the circuit components have been illustrated in the drawings by conventionally employed and readily understandable block representations, in order not to obscure the disclosure with circuit details which will be readily apparent to those skilled in the art having the benefit of the description herein.

Referring now to FIG. 3, the FSK demodulator and frequency recovery scheme according to the present invention is illustrated as having an input line 10 over which the FSK signals to be non-coherently demodulated are applied. In conventional fashion, FIG. 3 shows a set of quadrature channels, identical in every respect except for the 90° offset provided by phase shifter 13 in the output line of VCO 43. Input line 10 is coupled to a pair of multipliers 11 and 12 wherein the in phase and quadrature components of the incoming FSK signal are multiplied by the output of the carrier recovery loop oscillator VCO 43.

The product terms from these multipliers are coupled through low pass filters 14 and 15, respectively, and applied to respective sample and hold quantizing circuits 21 and 22, which periodically sample the multiplied filtered values from filters 14 and 15 to produce N samples per symbol. These in phase and quadrature digital sample representations are applied to a fast Fourier transform network (FFT) 24 and to respective delay circuits 25 and 26. Each of delay circuits 25 and 26 delays the outputs of quantizers 21 and 22 by one symbol period and applies the delayed signals to respective multipliers 32 and 33. The other input of each of multipliers 32 and 33 is derived from a remodulation unit 36 that is connected to the data output line 31 of the FFT network 24. It should be observed that fast Fourier transform networks are well known in the art and network 24 may be chosen from any suitable circuitry configuration, commonly employed in frequency and phase demodulation systems. An example of such a network is described in U.S Pat. No. 3,758,870, to Schmidt et al, which employs what is termed a discrete Fourier transform network for data recovery for the I and Q channels. Remodulation unit 36 modulates the data output of FFT 24 on line 31 in accordance with the original modulation scheme at the transmitter (not shown) in order to derive the required frequency error for subsequent signal processing. Namely, if the transmitted waveform is at frequency fi+fe, where fe is some error, FFT 24 will then make the decision that the $i^{th}$ symbol was originally transmitted, so that remodulation unit 36 will then generate fi. This signal is then coupled to multipliers 32 and 33, which multiply the respective outputs of delay circuits 25 and 26 by the fi waveform at the output of remodulation unit 36.

The operation of multipliers 32 and 33 effectively removes the fi waveform component as derived by remodulation unit 36 from the delayed samples supplied by the delay circuits 25 and 26, leaving only frequency error components (i.e. fi+fe−fi=fe) for the respective inphase and quadrature channels. These frequency error signals fe are applied to respective low pass filters 34 and 35 to obtain $fe_{LPF}$ and thereby improve the signal-to-noise ratio prior to being coupled to a linear discriminator 41. Discriminator 41 is a linear frequency discriminator which produces frequency estimates from the respective channels to produce a correction signal for driving the VCO 43. This correction signal is applied through the tracking loop filter 42 and is used to steer the carrier frequency of output VCO 43.

Referring to FIG. 1, curve B shows the significantly improved performance offered by employing the linear discriminator 41 which acts only upon the frequency error components from the decision directed demodulation portion of the system in accordance with the present invention. As can be seen in FIG. 1, the present invention produces, in effect, a truly linear frequency estimate characteristic for changes in input error.

Figure 2:
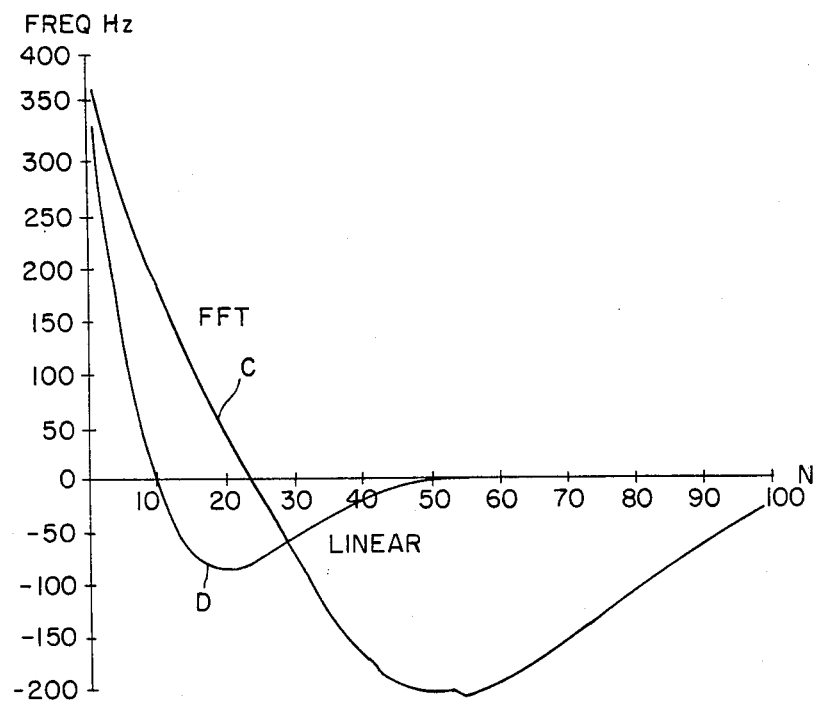
FIG. 2 shows a comparison between the closed loop response of a conventional FFT discriminator and a linear discriminator according to the invention.

Curve D of FIG. 2 shows how the closed loop response of the demodulation scheme of the present invention rapidly converges, as compared to the wide swings of an FFT loop which is used for both data recovery and frequency tracking, in the conventional approaches described previously.

Because of the tracking capability of the linear discrimination technique in accordance with the present invention, the data recovery and carrier tracking scheme described herein is especially attractive for frequency hopping modulation schemes which employ MFSK as a modulation technique. As noted previously, it may also be used for any type of orthogonal modulation scheme such as M-ARY code shift keying and M-ARY time shift keying.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. For use in a demodulator for detecting information symbols which are encoded in the form of a frequency shift keying carrier signal, said demodulator containing means for generating a local carrier signal, an arrangement for controlling said local carrier signal for tracking frequency changes therein comprising:

first means for combining said local carrier signal and an incoming frequency shift keying signal to be demodulated and producing therefrom signals representative of the modulation information contained in said incoming signals;

second means, coupled to said first means, for deriving output signals representative of the information symbols by which said carrier signal was modulated to form said frequency shift keying signals;

third means, responsive to signals produced by said first and second means, for deriving error signals representative of the frequency error in said local carrier signal; and linear discriminator means, responsive to said error signals, for controlling said local carrier signal generating means so as to track frequency changes in said incoming frequency shift keying signal to be demodulated.

2. An arrangement according to claim 1, wherein said first means comprises means for multiplying said incoming frequency shift keying signals by said local carrier signal and producing digital signals representative of the modulation information contained in said incoming signals.

3. An arrangement according to claim 2, wherein said third means comprises means for delaying said digital signals by a period of time corresponding to an information symbol interval and combining the resultant delayed digital signals with the output signals produced by said second means thereby deriving said error signals.

4. An arrangement according to claim 3, wherein said second means comprises a Fourier transform signal processing network for extracting said information symbols.

5. An arrangement according to claim 4, wherein said third means includes means for regenerating frequency modulation signals based upon the information symbols extracted by said Fourier transform signal processing network and multiplying said frequency modulation signals by said delayed signals so as to derive error signals representative of said frequency error.

6. An arrangement according to claim 2, wherein said first means includes means for producing quantized samples of the output of said multiplying means a plurality of times per information symbol interval and producing digital signals representative thereof.

7. An arrangement according to claim 5, further including low pass filter means coupled between the multiplying means of said third means and said linear discriminator means.

8. A demodulator for extracting information signals that have been encoded in the form of an FSK-modulated carrier signal comprising:

a controlled carrier oscillator;

first means coupled to receive an FSK-modulated carrier signal and combining said FSK-modulated carrier signal with the output of said carrier oscillator and producing therefrom signals representative of modulation information contained in said modulated signal;

second means, coupled to said first means, for deriving output signals representative of information symbols by which said carrier signal was modulated to produce said FSK-modulated carrier signal;

third means for combining the signals produced by said first and second means to obtain error signals representative of the frequency error in the output of said controlled carrier oscillator; and linear discriminator means for producing a control signal in accordance with the frequency error signal produced by said third means and coupling said control signal to said controlled carrier oscillator, so as to track frequency changes in said FSK-modulated carrier signal.

9. A demodulator according to claim 8, wherein said first means comprises means for multiplying said FSK-modulated carrier signal by the output of said controlled carrier oscillator and producing digital signals representative of said modulation information.

10. A demodulator according to claim 9, wherein said third means comprises means for delaying said digital signals by a period of time corresponding to an information symbol interval and combining the resultant delayed digital signals with the output signals produced by said second means thereby deriving said error signals.

11. A demodulator according to claim 10, wherein said second means comprises a Fourier transform signal processing network for extracting said information symbols.

12. A demodulator according to claim 11, wherein said third means includes means for regenerating frequency modulation signals based upon the information symbols extracted by said Fourier transform signal processing network and multiplying said frequency modulation signals by said delayed signals so as to derive error signals representative of said frequency error.

13. A demodulator according to claim 12, further including low pass filter means coupled between the multiplying means of said third means and said linear discriminator means.

14. For use in a non-coherent demodulator wherein information symbols from a received FSK-modulated carrier signal are extracted by a decision-directed signal process network, a method of controlling the frequency of a local carrier generator so as to track the variations in frequency in said received signal comprising the steps of:

combining said received FSK-modulated carrier signal with the local carrier signal from said local carrier generator and deriving therefrom a signal representative of the frequency error in said local carrier signal; and applying said frequency error representative signal to a linear discriminator exclusive of said decision-directed signal processing network, to produce a frequency estimate control signal that is applied to said local carrier generator to control the frequency of the local carrier generator.

* * * * *